UNITED STATES PATENT OFFICE.

ARTHUR HEINEMANN, OF LONDON, ENGLAND.

PROCESS FOR THE SYNTHETIC PRODUCTION OF GLYCERIN.

1,180,497. Specification of Letters Patent. Patented Apr. 25, 1916.

No Drawing. Application filed May 28, 1913. Serial No. 770,338.

*To all whom it may concern:*

Be it known that I, ARTHUR HEINEMANN, a subject of the King of Prussia, residing at 223 North End road, West Kensington, London, W., England, have invented an Improved Process for the Synthetic Production of Glycerin, of which the following is a specification.

The invention relates to an improved process for the synthetic production of glycerin.

According to the present invention propylene, which may be obtained by the union of acetylene and methane, or in other ways, is treated with chlorin, as a gas or as a suitable compound so as to produce dichlorpropane. This chlorination may be done in the presence of actinic rays. The dichlorpropane so produced is converted into allyl chlorid and the latter into trichlorpropane. Finally the trichlorpropane is mixed with water, with or without the addition of an alkali compound, and then heated so as to produce trihydroxypropane or glycerin.

The improved process may be carried out in the following manner: The propylene is obtained in any suitable way, but preferably according to the process described in the specification of my application for Letters Patent of the United States, of even date herewith, Serial No. 770,221. The propylene is converted into dichlorpropane by admixture with chlorin gas or by treatment with a suitable chlorin compound. The reaction is represented by the following equation:—

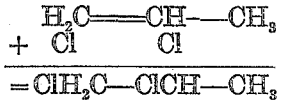

The dichlorpropane so produced is then again converted into an unsaturated compound by being deprived of a molecule of hydrochloric acid. This may be done by allowing it to drop on a heated alkali metal or other metal or on a suitable heated alkaline compound. For example, metallic magnesium, calcium or aluminum may be used or potassium hydrate, sodium hydrate, calcium hydrate, magnesium hydrate, etc., may be used.

The allyl chlorid or chlorpropylene resulting from the above reaction is then treated with chlorin gas or a suitable chlorin compound and converted into trichlorpropane. These reactions are represented by the following equations:

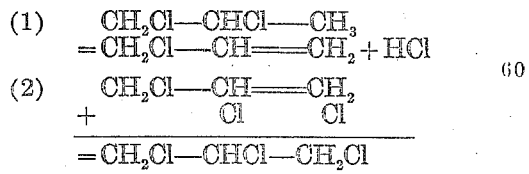

The trichlorpropane is then mixed with water, with or without the addition of alkali compounds such as sodium hydrate, potassium hydrate, sodium carbonate, or calcium hydrate, and heated so as to produce trihydroxypropane or glycerin.

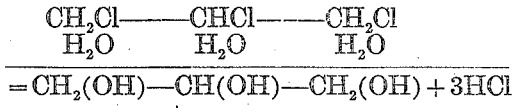

Having now described my invention what I have invented and desire to secure by Letters Patent in the United States is as follows:—

In the manufacture of glycerin, the process of converting dichlorpropane into allyl chlorid which comprises dropping said dichlorpropane on a heated alkali.

In testimony whereof I have signed my name to this specification in the presence of two subscribing witnesses.

ARTHUR HEINEMANN.

Witnesses:
ARTHUR F. ENNIS,
O. J. WITT.